(12) United States Patent
French

(10) Patent No.: US 6,275,127 B1
(45) Date of Patent: Aug. 14, 2001

(54) SOLAR POWERED MAGNETIC SUPPORT FOR DISPLAY

(76) Inventor: William Wallace French, 2486 Montgomery Ave., Cardiff-by-the-Sea, CA (US) 92007

( * ) Notice: Subject to any disclaimer, the term of this patent is extended or adjusted under 35 U.S.C. 154(b) by 0 days.

(21) Appl. No.: 09/690,971

(22) Filed: Oct. 17, 2000

Related U.S. Application Data

(60) Provisional application No. 60/160,142, filed on Oct. 18, 1999.

(51) Int. Cl.[7] ............................. H02K 7/09; H01F 7/20; H01H 47/00
(52) U.S. Cl. ................. 335/285; 310/90.5; 361/144; 40/426; 446/129; 318/135
(58) Field of Search ................. 335/285, 289, 335/290, 291; 310/90.5; 361/144, 146, 152, 154, 155, 156, 187, 188; 40/426; 446/129; 318/135

(56) References Cited

U.S. PATENT DOCUMENTS

| | | | |
|---|---|---|---|
| 3,815,963 | * 6/1974 | Wilk | 310/90.5 |
| 3,860,300 | * 1/1975 | Lyman | 310/90.5 |
| 4,356,772 | * 11/1982 | Van Der Heide | 104/282 |
| 4,382,245 | * 5/1983 | Harrigan | 335/306 |
| 4,585,282 | * 4/1986 | Bosley | 310/90.5 |
| 4,642,501 | 2/1987 | Kral . | |
| 4,643,034 | * 2/1987 | Favatella | 74/5.46 |
| 4,714,352 | 12/1987 | Ganter . | |
| 4,874,346 | 10/1989 | Wachspr . | |
| 4,910,633 | * 3/1990 | Quinn | 361/144 |
| 4,987,833 | 1/1991 | Antosh . | |
| 5,003,235 | * 3/1991 | Groom | 318/135 |
| 5,043,615 | 8/1991 | Oshima . | |
| 5,093,754 | * 3/1992 | Kawashima | 361/144 |
| 5,168,183 | * 12/1992 | Whitehead | 310/12 |
| 5,218,257 | 6/1993 | Tozoni . | |
| 5,300,842 | * 4/1994 | Lyons et al. | 310/90.5 |
| 5,404,062 | * 4/1995 | Hones et al. | 310/90.5 |
| 5,467,244 | * 11/1995 | Jayawant et al. | 361/144 |
| 5,495,221 | 2/1996 | Post . | |
| 5,638,340 | * 6/1997 | Schiefele | 368/179 |
| 5,692,329 | * 12/1997 | Tang | 40/424 |
| 5,696,412 | 12/1997 | Iannello . | |
| 5,732,636 | * 3/1998 | Wang et al. | 104/284 |
| 5,883,454 | * 3/1999 | Hones et al. | 310/90.5 |

FOREIGN PATENT DOCUMENTS

| | | |
|---|---|---|
| 7239652 | 9/1995 | (JP) . |
| 7244457 | 9/1995 | (JP) . |
| 7210081 | 10/1995 | (JP) . |

* cited by examiner

*Primary Examiner*—Ramon M. Barrera

(57) ABSTRACT

An intriguing and educational display structure (2) includes a translucent earth globe body (3) suspended by energy derived from solar cells (14) integral to the globe. The globe is suspended by magnetic forces between magnets within the support assembly (10) which is controlled by a servo system substantially integral to the globe and powered by the solar cells (14). The servo mechanism can be made to launch and land the suspended globe in response to changing levels of illumination. Energy can be stored within the globe to power occasional periods of suspension, even in very low light levels.

6 Claims, 4 Drawing Sheets

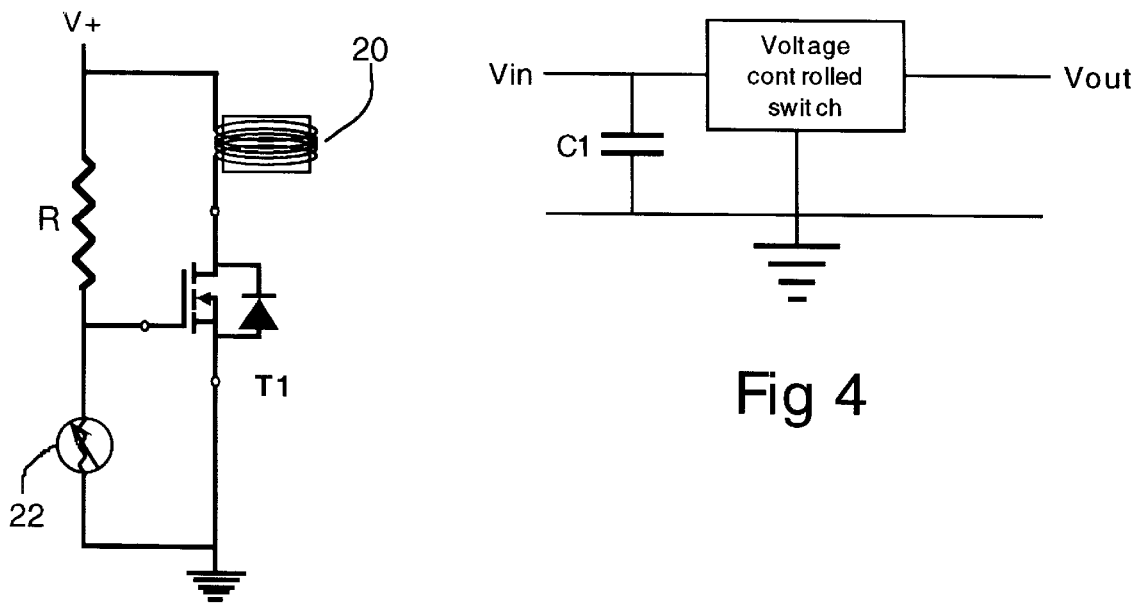
Fig 3
Fig 4
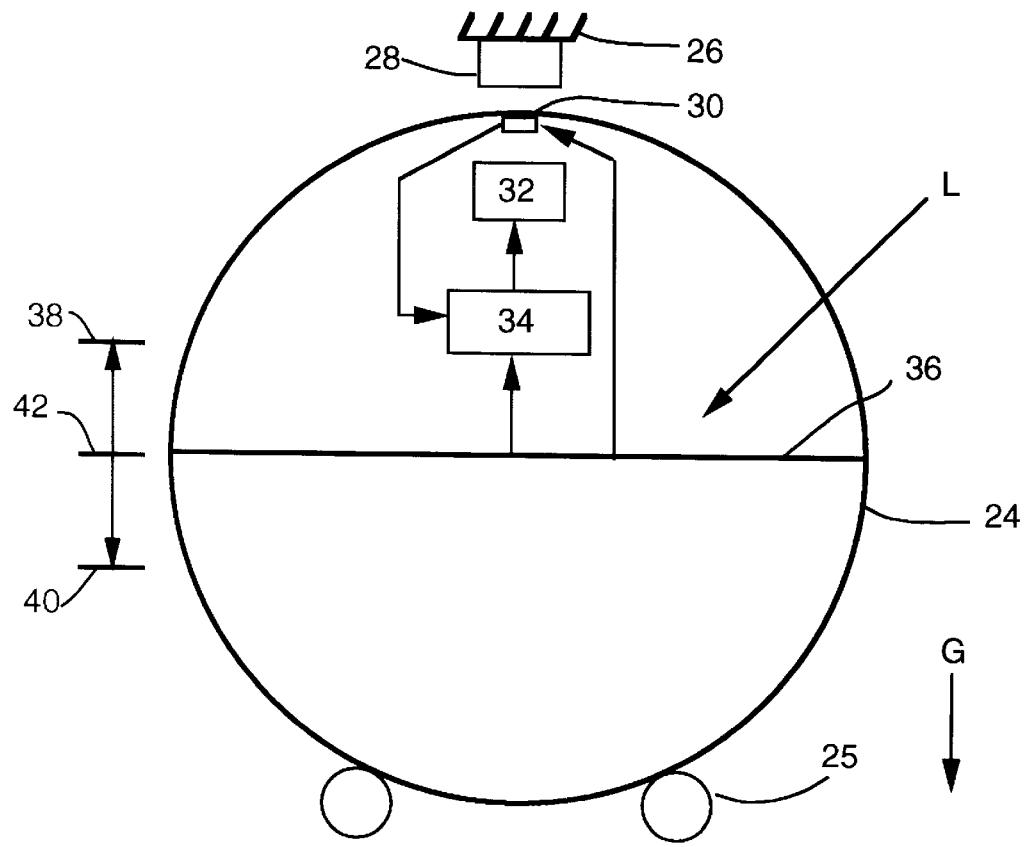
Fig 5

SOLAR POWERED MAGNETIC SUPPORT FOR DISPLAY

CROSS REFERENCE TO RELATED APPLICATIONS

This application is entitled to the benefit of Provisional Patent Application Ser. No. 60/160,142, filed, Oct. 18, 1999.

FIELD OF THE INVENTION

The instant invention relates to magnetically supported display devices, and more particularly to a body that is supported by magnetic forces, wherein electrical energy need to power electromagnets to stabilize the support mechanism is derived from ambient light.

BACKGROUND OF THE INVENTION

Magnetic levitation and suspension have been key elements in many novel and educational objects. A levitated body is herein understood to be a body not substantially physically in contact with anything external to the body during levitation, and supported by magnetic interactions with external magnetic elements substantially below the body. A suspended body is herein understood to be a body not substantially physically in contact with anything external to the body during suspension, and supported by magnetic interactions with external magnetic elements substantially above the body. Levitated tops, as first described in U.S. Pat. No. 4,382,245 by Harrigan, and in many patents by Hones, et al such as U.S. Pat. No. 5,404,062 comprise a large base magnet for creating a cup shaped magnetic field for supporting and constraining a magnetic top, stabilized against flitting over by its spinning. Hones, in U.S. Pat. No. 5,883,454, and Favatella in U.S. Pat. No. 4,643,034 describe methods of maintaining such a top at a constant spinning rate indefinitely. These top embodiments have several shortcomings. First, they are notoriously difficult to start spinning in a stable state. Second, they are very sensitive to ambient temperature and to the horizontal orientation of the magnetic field created by the base magnet. Third, they require a large, expensive base magnet even to levitate a small top. Fourth, they are inefficient and generally need a power cord to connect them to the mains for enough power to maintain rotation. Fifth, they generally must be launched manually. Sixth, they generally rotate too fast for any graphic elements on the top to be visible to an observer. Seventh, in the case of Favatella, the outside enclosure does not rotate at all, which reduces the effectiveness of the structure as a display device.

Numerous magnetic structures and electrical circuits have been described for suspending bodies magnetically by regulating the current in an electromagnet that is creating at least part of the magnetic field that is supporting the body. Some of these embodiments are described in U.S. Pat. No. 3,815,963 by Wilk, U.S. Pat. No. 3,860,300 by Lyman, U.S. Pat. No. 4,356,772 by van der Heide, U.S. Pat. No. 4,585,282 by Bosley, U.S. Pat. No. 4,910,633 by Quinn, U.S. Pat. No. 5,093,754 by Kawashima, U.S. Pat. No. 5,168,183 by Whitehead, U.S. Pat. No. 5,467,244 by Jayawan, U.S. Pat. No. 5,638,340 by Schiefele, U.S. Pat. No. 5,692,329 by Tang, U.S. Pat. No. 5.694,412 by Iannello, U.S. Pat. No. 5,732,636 by Wang, and Japanese patents JP 7-244457, JP 7-210081, and JP 7-239652 by Hiroshi. These embodiments generally suffer from two shortcomings. First, the active circuitry for stabilizing the levitation is within a non-levitated support structure which can make this structure somewhat bulky. Second, these embodiments generally derive the power to operate the circuitry and electromagnets from sources not integral to the levitated object. The embodiments of the prior art, particularly those intended to amuse and educate the observer, can be seen as simply objects on the end of a power cord that consume energy, something like a toaster.

The present invention results from an attempt to devise an intriguing and educational magnetically supported body that derives energy needed to power the support stabilization circuitry from an ambient field of light.

SUMMARY OF THE INVENTION

The practical advantages are well known of using electrical power derived from photovoltaic cells to power devices such as remote radio telephones, and the instant invention enjoys all those advantages, such as having no batteries to wear out and not requiring an inconvenient power cord to connect the device to the mains. However, the instant invention recognizes further benefits of using solar power to support a body, particularly in the case of the preferred embodiment, which is a suspended globe modeled after a heavenly body such as the earth. In this case, an observer will be drawn to an understanding and appreciation of the earth floating in space, autonomous, but for its dependence on energy and force fields from the sun. Observers will further be intrigued by the idea that there is enough energy density in ambient light to actually suspend a rather heavy object. Accordingly, it is a primary object of the instant invention to provide a magnetically supported object, wherein the energy to stabilize the support is derived from ambient light.

To most effectively inspire an observer to appreciate the role of sunlight in energizing the earth, it is preferred that the light be incident on the surface of the model globe, and not on any artificial, un-natural looking contraptions on the outer surface of, or external to, the globe such as solar panels. Accordingly, in the preferred embodiment, the photovoltaic cells are mounted within the globe, and the graphics on the globe surface obscure a direct view of the cells while allowing enough light through to power the circuitry.

It is understood that many sources of light such as the sun and man made lights do not provide power throughout the entire twenty-four hours of a day. Accordingly, it is a secondary object of the instant invention to provide a support mechanism that will mechanically support the object when insufficient light is available to power support mechanism, then will automatically initiate the magnetic support mechanism when ambient light is of sufficient brightness, and then will automatically return the object to the mechanically supported state when ambient light level again falls to low to power circuitry.

It is recognized that ambient light levels may never rise to a level sufficient to power the support stabilization circuitry continuously. Accordingly, it is a secondary object of the instant invention to provide a means to store electrical energy, in a capacitor or storage battery, for example, and means to apply the stored energy to initiate a launch sequence, support the body for a predetermined time or until a predetermined level of stored energy remains, and then to initiate a landing sequence of events to return the body to a mechanically supported state.

A substantially magnetically supported body will be exquisitely sensitive to forces such as air currents that would cause the body to rotate. Such rotation is particularly appropriate to a suspended model of the earth. Accordingly, it is also a secondary object of the instant invention to provide a supported body, preferably decorated with the graphic features of the earth, that can slowly rotate in response to air currents and other ambient forces.

BRIEF DESCRIPTION OF THE DRAWINGS

FIG. 3 schematic electrical diagram of the servo mechanism of FIG. 1.

FIG. 4 is a schematic electrical diagram of a circuit element that can be added to the embodiment of FIG. 1.

FIG. 5 is a generalized diagram of a suspended body and a servo mechanism for suspending it.

DESCRIPTION OF THE INVENTION

Figure 1:
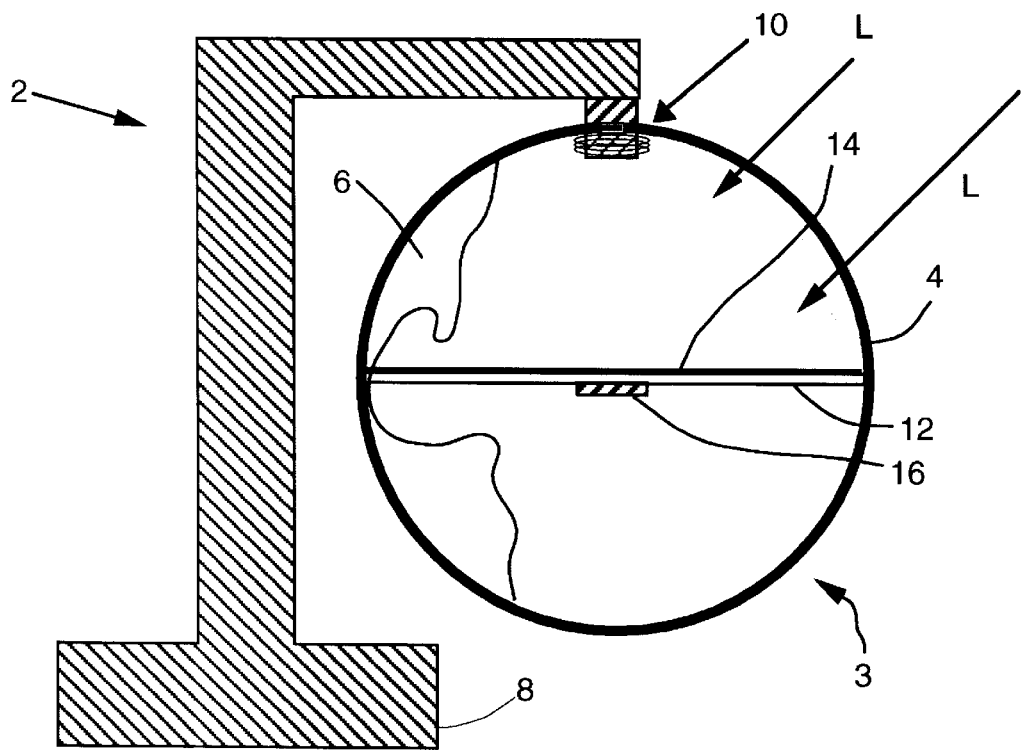
FIG. 1 is a cross-sectional view of the preferred embodiment.

Referring now to the drawings, there is shown in FIGS. 1, 2, and 3 a first embodiment of the invention 2 wherein a globe assembly 3 is supported by a suspension assembly 10 which is supported by a support stand 8. The globe assembly 3 comprises a globe sphere 4 preferably made of acrylic with translucent graphic features 6 on its surface representing the earth, an electronics package 16 and a solar battery 14 mounted on a septum 12. The solar battery 14 is illuminated by ambient light L passing through the translucent globe sphere 4. Wires, not shown, deliver current from the solar battery 14 to the electronics package 16, and from electronics package 16 to the suspension assembly 10.

Figures 2A, 2B, 2C:
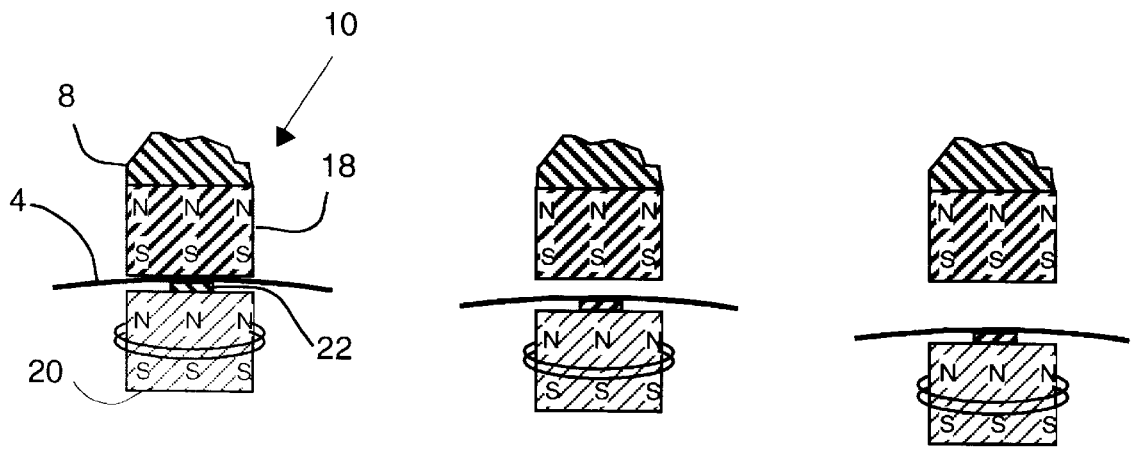
FIGS. 2a–2c are cross-sectional views of the suspension assembly of FIG. 1.

The suspension assembly 10 is shown in greater detail at various stages of its operation in FIGS. 2a, 2b, and 2c. A cylindrically shaped magnet 18 is fixed to the support 8. Mounted within the globe sphere 4 is a cylindrically shaped electromagnet 20, and a CdS photocell 22, with its light sensitive surface facing upward. As shown in FIG. 3, the electronics package 16 contains a MOSFET transistor T1 and a resistor R connected to the electromagnet 20 and photocell 22. The voltage V+ to drive this circuit is generated by the solar battery 14. The electromagnet 20 preferably consists of a cylinder of magnetically soft material such as soft iron, wrapped with many turns of conductive wire.

FIG. 2a shows the relative positions of the magnet 18 and the globe sphere when ambient light is too dim to support the globe sphere 4 in a suspended state. In this case, the magnet 18 induces magnetism in the soft iron material of the electromagnet 20 and the mutual attraction of magnet 18 and electromagnet 20 is sufficient to support the weight of the globe assembly 3. In this position the photocell 22 receives very little ambient light due to its proximity to magnet 18. As light L incident on the solar battery 14 increases in intensity, sufficient voltage will be delivered to the MOSFET T1 to turn it on, and current will start to flow through it and the electromagnet 20. The polarity of the current, windings and of the magnet 18 are arranged so that current through the electromagnet 20 will decrease the attractive force between the electromagnet 20 and the magnet 18. When this attractive force becomes less than the weight of the globe assembly 3, then the globe will descend to a position as shown in FIG. 2b, where the photocell 22 will begin to receive more ambient light, and the MOSFET will regulate the current delivered to the electromagnet 20 to maintain a constant height for the globe assembly 3.

When the globe assembly is in the position shown in FIG. 2b, the amount of light sensed by the photocell 22 will also depend on the general level of ambient light. As the ambient light intensity falls, the MOSFET T1 will deliver more current to the electromagnet 20 causing the globe assembly 3 to descend to the position shown in FIG. 2c to try and maintain the same light level on the photocell 22. When the ambient light intensity falls further to below a predetermined level, light on the photocell will cease to regulate the current through the electromagnet 20 because the solar battery 14 will be delivering all the current it can, given the low light level, so current through the electromagnet 20 will start to decrease, and the globe assembly 4 will rise back to the position shown in FIG. 2a.

FIG. 4 shows electronic circuitry that can be added to the electronics package 16 of FIG. 1 to allow that embodiment to operate at lower light levels, intermittently. Electric current from the solar battery 14 is delivered to the Vin connection of the circuit of FIG. 4, which charges capacitor C1. The Voltage Controlled Switch is designed to have an essentially infinite input resistance until some predetermined voltage, Vmin, is reached, at which point the electrical resistance from the Vin terminal to the Vout terminal becomes essentially zero, allowing current to flow from capacitor C1 to the Vout terminal. The Voltage controlled switch is further designed to have some hysterisis, so that its resistance from Vin to Vout remains at essentially zero, until the voltage at Vin falls below a second predetermined voltage, Vmin', which is lower than Vmin, at which time the resistance from Vin to Vout again becomes essentially infinite. The Vout terminal is connected to the V+ terminal of the circuit of FIG. 3.

The combined circuitry of FIGS. 2, 3, and 4 operates as follows. Even at very low light levels, capacitor C1 slowly charges up to a voltage level of Vmin at which time voltage Vmin is applied to the circuit of FIG. 3 to activate the suspension assembly 10 to cause, as already described, the globe assembly 3 do descend to a predetermined separation from support 8, and remain there until the voltage at Vin falls to Vmin', at which time the voltage at Vout is reduced to zero and the globe assembly 3 rises back into contact with support 8. It is understood that the suspension assembly 10, solar battery 14 and circuitry of FIGS. 3 and 4 can be designed so the light L is above some predetermined level of brightness, the globe will remain suspended continuously.

It is understood that many electrical circuits that could be used in the servo system need a predetermined level of voltage and current before they can work reliably. Accordingly, the circuit of FIG. 4 can be advantageously applied to regulate the application of power to the servo system, even if no current storage means is used, such as C1.

FIG. 5 illustrates a more generalized form of the first embodiment 2. A body 24 comprising a position sensor 30, an electromagnet 32, a current driver 34, and a solar battery 36 is shown supported against the pull of gravity G in a ring shaped bottom support 25. A magnet 28 is attached to a top support 26. Electrical power for the position sensor 30 and the current driver 34 is supplied from the solar battery 36 as indicated by arrows from the solar battery 36 to the position sensor 30 and the current driver 34, respectively. The arrow from the position sensor 30 to the current driver 34 indicates a control signal path from the position sensor 30 to the current driver 34.

The magnet 28 and electromagnet 32 can be made in several ways, known to those skilled in the art, to perform their function of interacting to support the body 24. For example, magnet 28 could be made of soft ferromagnetic material such as soft iron, in which case it would be magnetized by magnetic fields generated by the electromagnet 32. Alternatively, magnet 28 could be a permanent magnet, which would induce magnetism in the electromagnet 32 and the strength of this magnetization could be increased or decreased, as need, by magnetic fields generated by current carrying coils of wire around electromagnet 32.

The electromagnet 32 can be made of soft ferromagnetic material as described for FIG. 2, or it can be made of a hard permanent magnet material, or it can be a combination of magnetically soft and hard materials. It is preferable, as generally taught by Lyman in U.S. Pat. No. 3,860,300, that at least one of the magnetic elements, magnet 28 and electromagnet 32, include some hard, permanently magnetized material, and this permanent magnet part be so designed and disposed that substantially all of the weight of the body 24 is supported by the magnetic fields generated by this permanent magnetic part when the body 24 is at its equilibrium suspended position. The electromagnet 20 is intended to be any kind of magnetic element that creates a magnetic field, wherein the strength of that field can be modulated by modulating a current supplied to the electromagnet 20.

While only one pair of interacting magnetic elements, magnet 28 and electromagnet 32, is shown, it is understood that other interacting pairs could be disposed within the embodiment of FIG. 5 for contributing to the suspension of body 24. For example, a second pair of magnetic elements similar to magnet 28 and electromagnet 32 could be disposed on lower bottom support 25 and near the lower part of body 24, respectively, for generating additional lifting forces on body 24, by means of repelling magnetic elements.

It is understood that the position sensor 30 can have many well known forms and modes of operation and still serve its general function of sensing the relative positions of magnetic elements, magnet 28 and electromagnet 32, and providing a signal to the current driver 34. For example, the sensor could be a Hall Effect sensor for measuring the magnetic flux density between magnet 28 and electromagnet 32. Alternatively, as will be described later, the inductance of the electromagnet 32 depends on its proximity to magnet 28 and could be sensed, and used to control the current in electromagnet directly.

The current driver 34 can be a MOSFET as shown in FIG. 3, or can be other well known current controllers and schemes, depending on the nature of position sensor 30 and electromagnet 32.

A body such as 24 which is to be magnetically suspended, will not be suspended whenever current supplied to the electromagnet 32 is below some predetermined level, Imin. Accordingly, when the current to the electromagnet is below Imin the body 24 will either be resting against the support 25 or be pulled upward into contact with magnet 28 as in the embodiment of FIG. 1.

The position sensor 30, magnet 28, electromagnet 32 and current driver 34 comprise a servo system for suspending the body 24. It is preferable that this servo system be able to initiate and end the state of suspension as the intensity of the light L rises and falls, respectively, without the intervention of an observer.

Such a servo system will, when appropriately designed and powered, be able to support the body 24 at a predetermined height and will be able to return the body 24 to that height when something causes a perturbation in the position of the body 24, either upward or downward, so long as that perturbation is within a predetermined range. This is illustrated in FIG. 5 by the upper servo limit 38, lower servo limit 40, and servo equilibrium position 42. This servo system has an effective range from the upper servo limit 38 to the lower servo limit 40. The servo system of FIG. 5 is predetermined to have an equilibrium position for the body 24 at a height where the body 24 will be magnetically suspended. The upper servo limit 38, lower servo limit 40, and servo equilibrium position can all depend on the level of electrical power being delivered to the system. It is preferable to use a circuit such as shown in FIG. 4 to help control the power applied to the servo system. In the case where the body 24 is held in contact with the magnet 28 when there is insufficient current to drive the servo system, then the upper servo limit 38 should be high enough that the body 24 will be within the servo range when sufficient current is supplied to drive the servo system. This will insure that the servo system will move the body 24 to an equilibrium suspended position, 42 when sufficient current is supplied to the servo system. In the case where the body 24 is supported by the bottom support 25 when there is insufficient current to drive the servo system, then the lower servo limit 40 should be low enough that the body 24 will be within the servo range when sufficient current is supplied to drive the servo system. This will insure that the servo system will move the body 24 to an equilibrium suspended position, 42.

There are many well known servo system designs that have been used to suspend objects, and can serve in the instant invention, as generally described for FIG. 5. The suspension structures and servo mechanisms recorded in U.S. Pat. No. 3,8159,634 by Wilk, U.S. Pat. No. 3,860,300 by Lyman, U.S. Pat. No. 4,356,772 by van der Heide, U.S. Pat. No. 4,585,282 by Bosley, U.S. Pat. No. 4,910,633 by Quinn, U.S. Pat. No. 5,003,235 by Groom, U.S. Pat. No. 5,300,842 by Lyons, et al, U.S. Pat. No. 5,467,244, by Jayawant, et al, U.S. Pat. No. 5,692,329 by Tang, are incorporated herein by this reference.

Figure 6:
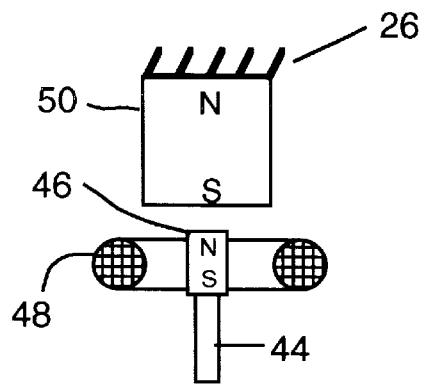
FIG. 6 is a cross-sectional view of a suspension servo mechanism of the prior art.

A suspension structure and servo mechanism of the prior art, U.S. Pat. No. 4,356,772 by van der Heide, is shown in FIG. 6 comprising a suspended body 44, fixedly attached to a first magnet 46, a toroidal coil of wire 48, and a second magnet 50 supported by support 26. The application of an appropriate current to the toroidal coil of wire 48 will cause the first magnet 46 and the suspended body attached to it to be suspended by a mechanism described in U.S. Pat. No. 4,356,772. In this embodiment, most of the weight of the suspended body and the first magnet 46 is supported by the simple attraction between first magnet 46 and second magnet 50. The position sensor function, attributed to position sensor 30, and the current driver function, attributed to the current driver 34, and the electromagnet function attributed to the electromagnet 32, in FIG. 5, are all performed by the first magnet 46 and the toroidal coil of wire 48, driven by an appropriate electrical current.

Figure 7:
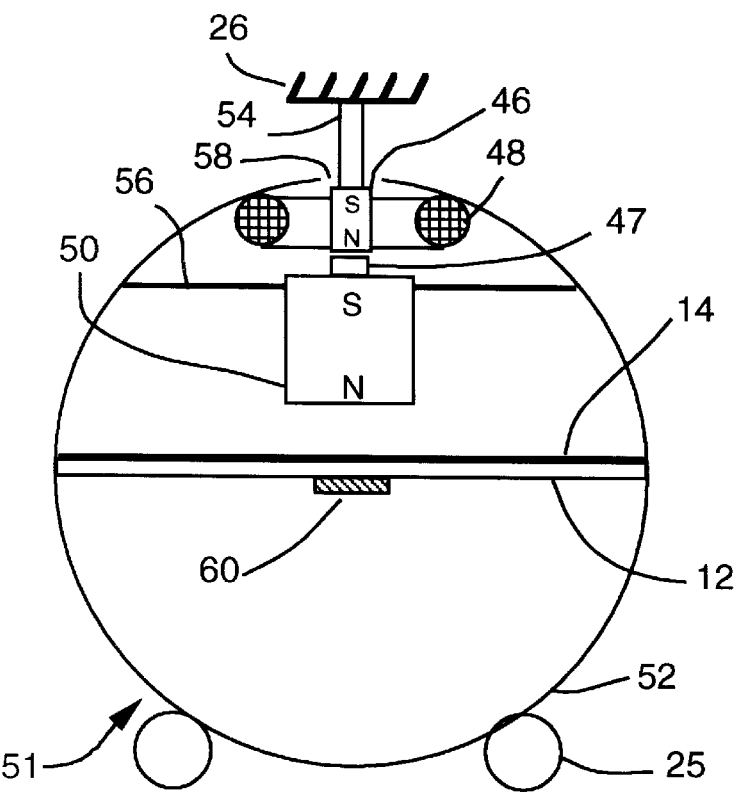
FIG. 7 is a side cross-sectional view of a body suspended by an inverted version of the servo mechanism of FIG. 6.

FIG. 7 shows how the embodiment of FIG. 6 can be inverted, consistent with the instant invention, to support a toroidal coil of wire 48 and the second magnet 50. In this embodiment the toroidal coil of wire 48 is fixedly attached to the inside surface of a translucent sphere 52 to help provide a stabilizing suspension force for the main suspension force caused by the magnetic attraction of first magnet 46 and second magnet 50, wherein the first magnet 46 is attached to a support 26 by means of a shaft 54 passing through hole 58 in translucent sphere 52 and second magnet 50 is attached to the inside of the translucent sphere 52 by means of support disk 56. A solar battery 14 when illuminated by light L supplies power by means of wires, not shown, to an electronics package 60 which generates appropriate electrical signals to power toroidal coil of wire 48 by means of wires not shown. A spacer disk 47 preferably limits the proximity of the first and second magnets, 46 and 50 when the servo system is not active.

In the absence of sufficiently bright light to power the electronics package 60, the globe assembly 51, comprising everything attached to the translucent sphere 52, is either pulled up by the magnetic attraction of the first and second magnets, 46 and 50 until stopped by mutual contact with the spacer disk 47, or falls in response to gravity until it is supported by contact between the first magnet 46 and the rim of the hole 58. In either case, the dimensions, and other design parameters are preferably chosen so that the relative position of the first magnet 46, the second magnet 50 and the position of the toroidal coil of wire 48 will be within the servo range discussed for FIG. 5. In this case, when sufficient current is delivered from the solar battery to operate the electronics package 60, then the magnets 50 and 46 will move into the predetermined equilibrium position and the globe assembly 51 will be suspended.

Figure 8:
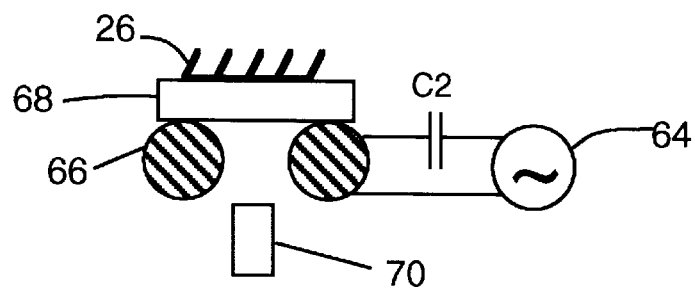
FIG. 8 is a cross-sectional view of a suspension servo mechanism of the prior art.

FIG. 8 illustrates a well known servo mechanism from the prior art for suspending an object. Here a coil of wire 66 is supported by a mounting block 68 fixed to a support 26. A source of AC current 64 at a predetermined frequency is connected to the coil of wire 66 as shown, in series with a capacitor C2. A magnetically permeable body 70 is positioned below the coil of wire 66. The coil of wire and the capacitor C2 will form a resonant circuit, whose resonant frequency depends on the inductance of the coil of wire 66, which in turn depends its proximity to the permeable body 70. The magnetic field of alternating polarity generated by the coil of wire 66 will induce magnetization in the permeable body 70 and generate an upward force on the body 70. At a predetermined position of body 70, the upward force will exactly equal its weight, and it will be suspended. The characteristics of the coil of wire, the permeable body 70, and the capacitor C2 are all predetermined to have a resonant frequency slightly below the frequency of the AC source 64. Thus, if the height of the suspended body 70 is perturbed upward, the inductance of the coil of wire 66 will rise, the resonant frequency of the circuit will drop, and less current will flow in the coil of wire 66, so the magnetic body will be supported with less force, and so it will tend to descend toward its equilibrium position. Conversely, a downward perturbation will increase the resonant frequency, increase the current, increase the lifting force and lift the body 70 upward toward its equilibrium position. There is a counter set of tendencies, caused by the fact that as the body 70 rises it gets closer to the coil of wire 66, which tends to further increase the lifting force on the body, but the proper design of the resonant circuit can easily over come this de stabilizing tendency, both for upward and downward movements. In this case, as in the case of the embodiment of FIGS. 6 and 7, the functions of position sensing and current controlling are performed by an advantageous interaction of components, rather than by the more discrete, single function elements of the first embodiment. The net effect is similar; the position is sensed, the electromagnet is regulated to suspend the object stability, and the servo mechanism will have an upper servo limit, a lower servo limit and a servo equilibrium position.

Figure 9:
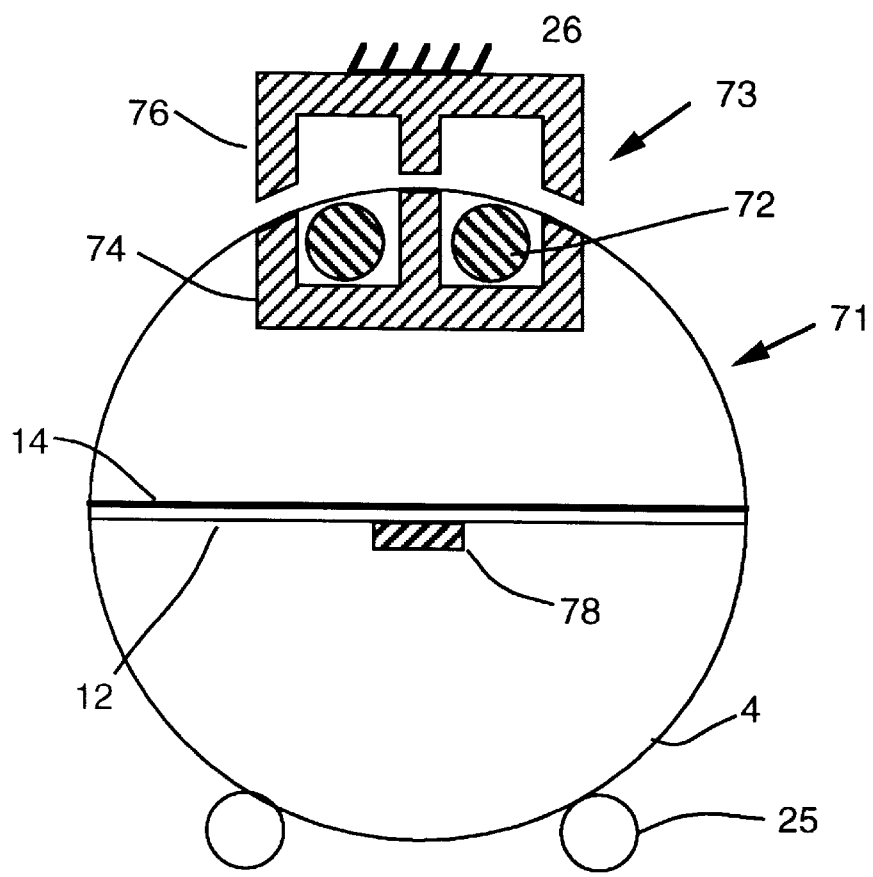
FIG. 9 is a side cross-sectional view of a body suspended by an inverted version of the servo mechanism of FIG. 8.

FIG. 9 shows how the prior art servo mechanism of FIG. 8 can be inverted, and used to suspend a globe assembly 71, comprising a spherical outer shell 4, an AC generator 78 which is powered by a solar cell 14 mounted on a septum 12 in the center of a globe shell 4. The globe assembly 71 is shown mechanically supported by a bottom support 25, as it would be when it is not being magnetically suspended. A suspension assembly 73 comprises an upper permeable element 76 mounted on a support 26, and in a position to interact with a lower electromagnet 74 containing a coil of wire 72. One or both of the upper permeable element 76 and the lower electromagnet 74 are preferably permanently magnetized to some degree to help support the weight of the globe assembly 71, but is recognized that magnetic elements contributing to the inductance of the coil of wire 72 are preferably not magnetically saturated by the permanent magnet parts, as such saturation would reduce the sensitivity of the inductance of the lower electromagnet 74 to the position of the upper permeable element 76, and thereby reduce the sensitivity of the servo mechanism. Alternatively, permanent magnetic elements could be mounted distant from the lower electromagnet and upper permeable element, to help provide additional suspension forces. It is understood, for example that suspension assembly 73 could be mounted in the lower part of the outer shell 4, and passive magnetic elements near the top of the outer shell 4 and on the support 26 could provide a substantial part of the suspension force. The suspension assembly 73 of FIG. 9 operates in essentially the same way as described for FIG. 8 to stabilize the height of the suspended globe assembly 71.

It is understood that the levitation mechanism described in U.S. Pat. No. 5.168,183 by Whitehead and incorporated herein by this reference, can be used to levitate a body, as taught by the instant invention, by inverting the arrangement of the parts, analogous to what was described for the prior art suspension systems of FIG. 6 and FIG. 8., and providing a solar battery on the levitated body.

Conclusions, Ramifications, and Scope

While the instant is primarily describing bodies supported from above by magnetic forces, it is understood that magnetic elements below the bodies could also contribute significant lifting forces and height stabilizing forces to a suspended body, without deviating from the teaching of the invention.

The supported body could take many forms. For example, celestial objects, satellites, "flying saucers", soccer balls, and balls covered with photographs of people. The supported object need not resemble anything in particular; it can simply include decorative graphic elements.

While the preferred embodiments of the invention have been described, modifications can be made and other embodiments may be devised without departing from the spirit of the invention and the scope of the appended claims.

What is claimed is:

1. An apparatus comprising a support and a body,
wherein said support comprises a magnet;
wherein said body comprises a solar battery for providing electrical current to operate a servo mechanism comprising:
said magnet;
an electromagnet fixedly attached to said body;
a current driver integral to said body;
a position sensor for sensing the relative position of said body and said magnet, wherein said servo mechanism is designed to hold said body in a supported position against the downward pull of gravity by means of controlling the magnetic forces between said magnet and said electromagnet.

2. The apparatus of claim 1 wherein:

the said body is further designed to be supported at a mechanically supported position by a mechanical contact with an object external to said body when said servo mechanism is not holding said body in said suspended position, wherein said mechanically supported position is between a servo limit and a servo equilibrium position, whereby said servo mechanism can move said body out of said mechanically supported position into said suspended position, and whereby said servo mechanism can also move said body from said suspended position back into said mechanically supported position.

3. The body of claim 2 which further comprises:

a voltage controlled switch for detecting a first and a second level of applied voltage to said servo mechanism, wherein said first level is higher than said second level, and wherein said voltage controlled switch applies electrical current to operate said servo mechanism whenever the level of said applied voltage rises above said first level, whereby said body is caused to move out of mechanically supported position into said suspended position;

wherein further, said voltage controlled switch turns off said electrical current energizing said servo mechanism whenever said applied voltage falls below said second level, whereby said body is caused to move out of said suspended position and into said mechanically supported position.

4. The body of claim 3 further comprising storage means to contain stored electrical current from the said solar battery.

5. The apparatus of claim 1 wherein the said body further comprises a translucent outer spherical container, including graphic elements on the said container to represent the earth.

6. The apparatus of claim 1 wherein:

the position sensor comprises a light sensitive element mounted on the said body in such a way that changes in the height of the said body will change the amount of ambient light sensed by the light sensitive element and thereby sense the height of the said body.

* * * * *